United States Patent [19]
Bogie

[11] 3,994,621
[45] Nov. 30, 1976

[54] WINDMILL

[76] Inventor: Townsend Bogie, 1151 Hoyt Ave., Indianapolis, Ind. 46203

[22] Filed: July 9, 1975

[21] Appl. No.: 594,221

[52] U.S. Cl. .................................... 415/186; 415/2
[51] Int. Cl.² .......................................... F03B 3/18
[58] Field of Search .................................. 415/2–4, 415/183, 185, 186, 202, 203, 211

[56] References Cited
UNITED STATES PATENTS

| | | | |
|---|---|---|---|
| 578,759 | 3/1897 | McElroy | 415/186 |
| 1,062,099 | 5/1913 | Hoglund | 415/202 |
| 1,234,405 | 7/1917 | Solomon | 415/3 |
| 1,441,774 | 1/1923 | Adams | 415/4 |
| 1,503,061 | 7/1924 | Pendergast | 415/4 |
| 2,096,119 | 10/1937 | Lensch et al. | 415/4 |
| 2,431,111 | 11/1947 | Dubrie | 415/4 |

FOREIGN PATENTS OR APPLICATIONS

| | | | |
|---|---|---|---|
| 25,009 | 3/1920 | France | 415/2 |
| 545,003 | 7/1922 | France | 415/2 |
| 576,980 | 5/1924 | France | 415/2 |
| 729,533 | 12/1942 | Germany | 415/4 |
| 169,733 | 9/1921 | United Kingdom | 415/2 |

Primary Examiner—C. J. Husar
Attorney, Agent, or Firm—Jenkins, Hanley & Coffey

[57] ABSTRACT

A windmill comprising a generally cylindrically shaped housing having a vertical axis, a vertical shaft concentrically disposed in the housing and a rotor fixedly attached to the shaft and comprising a plurality of equally peripherally spaced, vertically extending trough-shaped wind scoops. Each scoop has a closed back surface with vertically extending leading and following edges and a vertically extending open front exposed to the wind. Each scoop is attached at its edges to the adjacent scoops to form a generally cylindrical scoop assembly. The housing comprises a plurality of equally peripherally spaced apart stationary wind-directing and concentrating vanes, each vane having a proximal end forming a cylindrical surface substantially concentric with the axis of rotation of the scoop assembly, the cylindrical surfaces and the scoop assembly being of substantially equal diameter for closely spacing the scoop assembly and vanes, and each of the vanes projecting outwardly generally tangentially from the cylindrical surfaces of the proximal ends of the vanes and scoop assembly. The length of the arc of the cylinder formed by the proximal end of each vane exceeds the length of the arc of the cylinder described by the open front of each of the wind scoops for preventing the escape of air impinging upon the inner surfaces of the scoops from between the scoop and the proximal end of the stationary vane.

10 Claims, 8 Drawing Figures

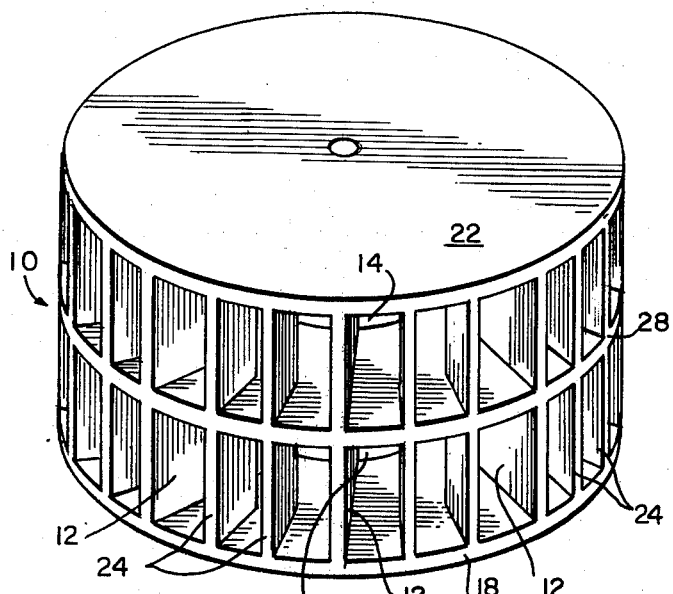
Fig.1
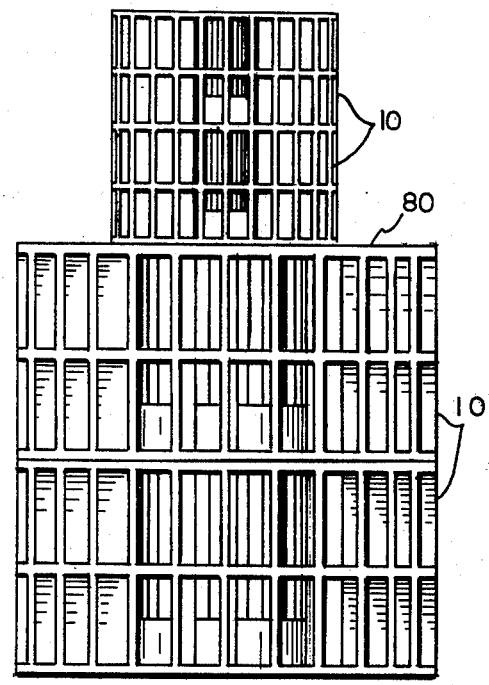
Fig.4
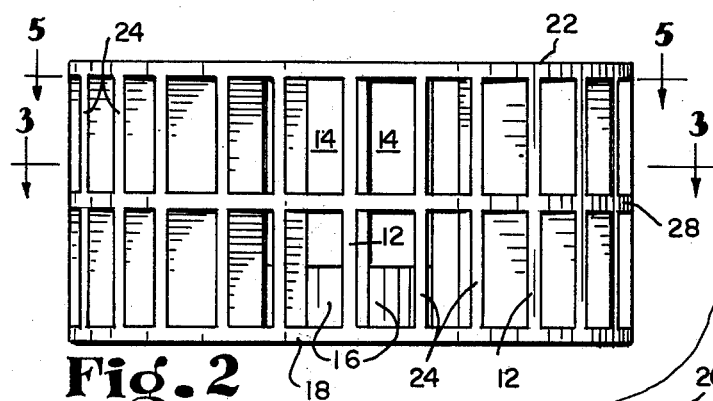
Fig.2
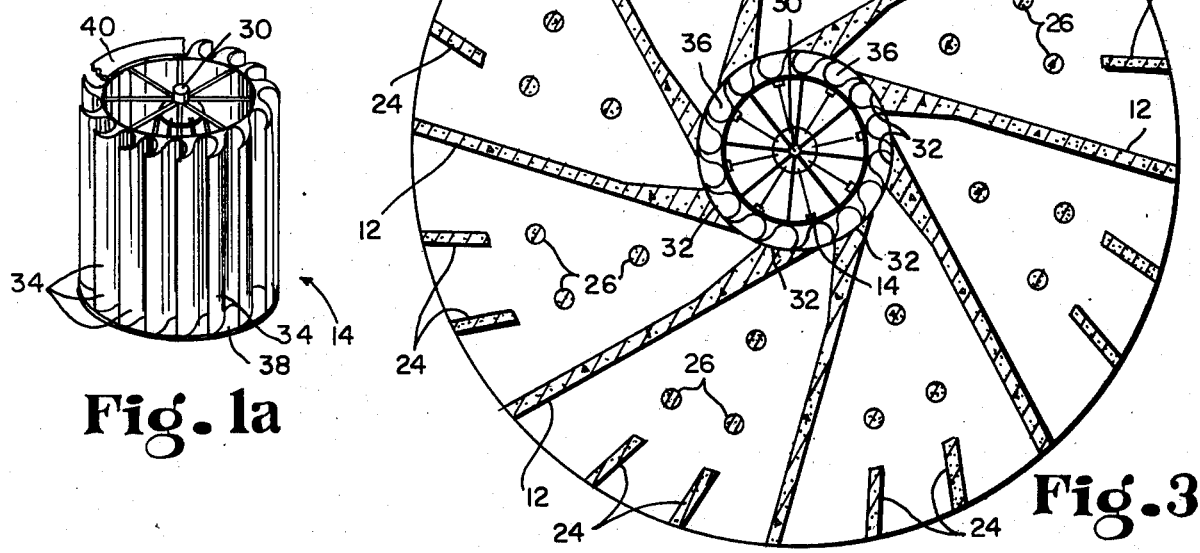
Fig.1a
Fig.3

WINDMILL

BACKGROUND OF THE INVENTION

This invention relates to vertical shaft windmills.

The windmill is a well-known method of harnessing naturally occurring forces. It has been suggested as a possible alternative to other sources of energy which are becoming more scarce or less readily accessible. Windmills may be thought of as being of two basic types, those with horizontal shafts and those with vertical shafts. Many vertical shaft windmills are disclosed in the prior art, for example, U.S. Pat. Nos. 250,806 issued Dec. 13, 1881 to Hamel; 588,572 issued Aug. 24, 1897 to Hardaway; 863,715 issued Aug. 20, 1907 to Higby et al.; 864,789 issued Sept. 3, 1907 to Kickbush; 1,234,405 issued July 24, 1917 to Solomon; and 1,382,591 issued June 21, 1921 to Ackermann.

The present invention deals with an improved arrangement for stationary wind directing and concentrating vanes and rotors for vertical shaft windmills. In accordance with the invention, a windmill comprises a vertical shaft having a rotor fixedly connected thereto. The rotor comprises a series of vertically extending, equally peripherally spaced trough-shaped wind scoops, each of which has leading and following edges joined respectively to the following and leading edges of adjacent wind scoops to form a generally cylindrical scoop assembly, the peripheral width of the open face of each scoop defining a length of the arc of the generally cylindrical assembly. Wind is directed toward and concentrated upon, the open faces of the scoops by a series of stationary wind directing and concentrating vanes which are peripherally spaced about the generally cylindrical scoop assembly in a generally tangential fashion. The proximal ends of the stationary vanes adjacent the scoop assembly are concentrically cylindrically shaped and approximate the curvature of the cylinder defined by rotation of the scoop assembly. The length of arc represented by the stationary proximal vane ends adjacent the rotor is greater than the arc length of the wind scoops. Wind is thus prevented from escaping from a given scoop as that scoop moves behind the cylindrically shaped proximal end of a stationary vane.

In accordance with a preferred embodiment of the invention, such windmills are constructed one upon another and joined by a common shaft to form a composite windmill.

The invention may best be understood by referring to the following detailed description and accompanying drawings of which:

FIG. 1 is a perspective view of a windmill constructed in accordance with the present invention;

FIG. 1a is a perspective view of the rotor of said windmill;

FIG. 2 is a side view of said windmill;

FIG. 3 is a partial and enlarged sectional view of said windmill taken along section line 3—3 of FIG. 2;

FIG. 4 is a side view of a composite windmill constructed in accordance with the invention;

Figure 5:
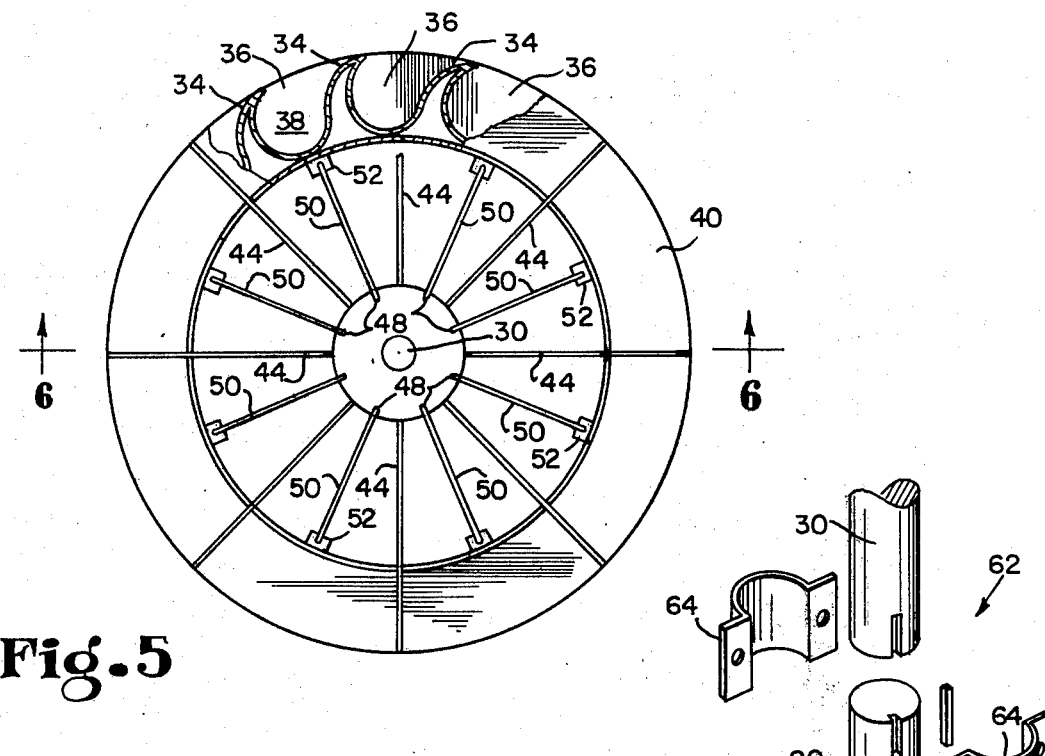
FIG. 5 is a sectional view, partially cut away, of the windmill of FIG. 2 taken along section line 5—5 thereof.

The windmill of FIGS. 1, 2 and 3 comprises a generally cylindrical housing 10 having a series of equally peripherally spaced concentrator vanes 12 disposed about a rotor 14, said rotor being centrally positioned on a pedestal 16 which rises above the floor 18 of said housing. Housing 10 further comprises a roof 22. Rotor 14 is mounted on a vertical shaft 30 which is journal mounted concentrically in the housing 10 by bearings situated on roof 22 and in pedestal 16.

Vertical support members 24 which also serve as secondary wind directing vanes are equally peripherally located between the outward ends of main concentrator vanes 12. The members 24 extend inwardly from the outer periphery of housing 10 only part of the way to rotor 14. The support function of members 12 and 24 may be augmented by vertical pillars 26 disposed between floor 18 and roof 22. Pillars 26 are omitted from FIGS. 1 and 2 for purposes of clarity. Housing 10 further includes a horizontal support member 28 disposed intermediate floor 18 and roof 22. The floor, roof, pedestal, main concentrator vanes, secondary vanes and pillars may be assembled from reinforced concrete or other suitable material to form a strong, intergrated structure.

FIG. 1a is a perspective view of rotor 14. Rotor 14 is fixedly connected to vertical shaft 30 so that the two rotate together. Rotor 14 comprises a series of vertically elongated, trough-shaped wind scoops 34 joined together along their vertical leading and following edges to following and leading edges respectively of their next adjacent wind scoops. Scoops 34 further are closed at their upper and lower ends by flat rings 40 and 38 respectively, to form a generally cylindrical scoop assembly. Part of upper ring 40 is cut away in FIG. 1a to show some details of construction of wind scoops 34. The wind scoops and end rings may be formed of sheet metal of other suitable material to acheive the desired light weight, strength and rigidity. The details of the attachment of the scoop assembly to shaft 30 will be dealt with hereinafter.

As shown in FIG. 3, main concentrator vanes 12 extend generally tangentially from the cylinder generated by rotation of rotor 14 on its central shaft 30 to the outer periphery of housing 10. The term "generally tangentially" as applied to a circle or cylinder herein means as a secant of said circle or cylinder and as a tangent of a circle or cylinder of slightly smaller radius.

The proximal ends 32 of main concentrator vanes 12 adjacent to rotor 14 are arcs of a cylinder which is concentric with the cylinder defined by rotation of rotor 14 and only slightly larger than said cylinder of rotation. The small radial clearance thus provided impedes the escape of air from wind scoops 34 as rotor 14 turns. Wind scoops 34 are trough-shaped and have open faces 36 which are exposed to wind entering from the distal ends of concentrator vanes 12 around the outer periphery of housing 10. The open faces 36 constitute a given length of arc of the outer periphery of rotor 14. This length of arc of open faces 36 is less than the length of arc of proximal ends 32 of concentrator vanes 12. These features of the rotor and concentrator vanes aid in preventing the escape of air from wind scoops 34 before the entrapped air forces the rotor to turn through an arc approximately equal to the arc of proximal ends 32. Flat rings 38 and 40 are attached to the bottom and top ends respectively, of the scoop assembly thereby further enclosing scoops 34 and impeding the escape of air from the scoops.

Figure 6A:
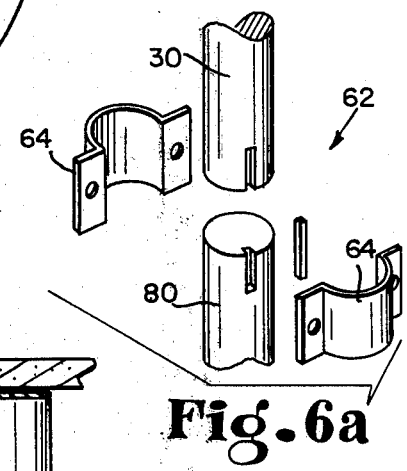
FIG. 6a is an exploded view of a construction detail of a windmill constructed in accordance with the present invention.
Figure 6:
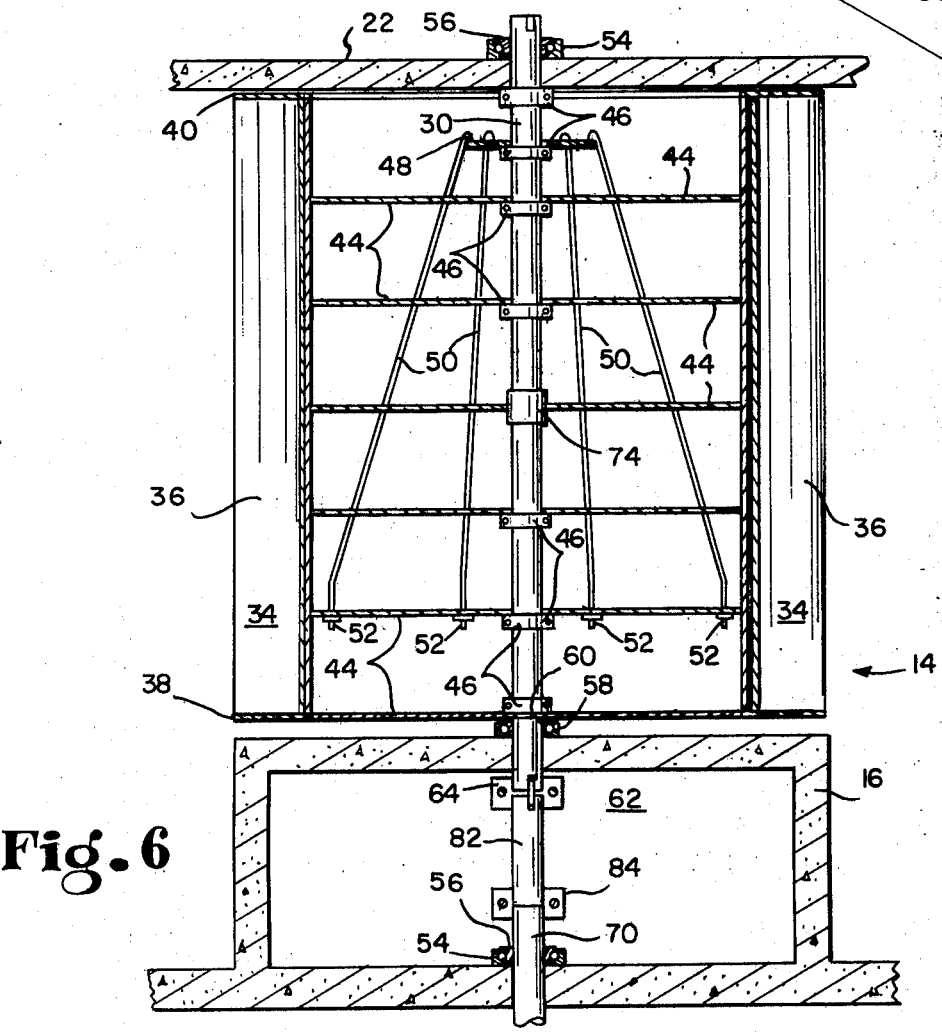
FIG. 6 is a sectional view of the windmill of FIG. 5 taken along section line 6—6 thereof.

FIGS. 5 and 6 illustrate details of the construction of rotor 14. The assembly of wind scoops 34 is attached to shaft 30 by a plurality of horizontal braces 44. Horizontal braces 44 are attached to a plurality of clamps 46 which may be attached to shaft 30 by body-bound bolts or countersunk set screws or other desirable fastening means. Clamps 46 are thus removable from shaft 30 for ease of assembly and disassembly of the rotor assembly upon shaft 30. A plurality of positions 48 are provided around the periphery of one of the uppermost of the clamps 46 on shaft 30 for attaching a plurality of downwardly depending rotor suspension rods or cables 50 thereto. An equal number of positions 52 are provided near the lower end of the rotor assembly outwardly from shaft 30 for attaching rods or cables 50 thereto. The lower ends of suspension means 50 may be threaded and nuts may be used thereon or turnbuckles may be provided intermediate the ends of means 50 to adjust the tension between the clamp 46 at which their upper ends are fixed to the top of the shaft 30 and points 52 near the bottom of rotor 14 at which their lower ends are fixed. In this manner, additional support for rotor 14 upon shaft 30 may be provided to prevent the scoop assembly of rotor 14 from sagging.

FIGS. 6 and 6a further illustrate the construction of the pedestal 16 of the windmill housing. Ball bearings are journalled between cups 54,58 on the roof of housing 10 and the upper floor of pedestal 16 respectively, through which the central shaft 30 protrudes, and cones 56,60, secured to shaft 30. The bearing surfaces of cups 54,58 and cones 56,60 thus support the weight of the shaft and rotor assembly. An additional bearing cone and cup assembly 56,54 is provided on the lower floor of pedestal 16 for supporting a shaft 70 which protrudes through the pedestal floor.

As shown in FIG. 6, shaft 30 may be divided into two approximately equal length portions which may be joined by a threaded coupler 74. Coupler 74 fixes the halves of shaft 30 solidly together but allows uncoupling of the halves should a need arise to remove or repair either or both of the halves of shaft 30. To this same end, i.e., ease of assembly and disassembly, a short section coupler shaft 80 is provided between the vertically spaced apart floors of pedestal 16. Coupler shaft 80 is coupled to shaft 30 by an expansion joint 62. Joint 62, an exploded view of one embodiment of which is shown in FIG. 6a, is provided with a collar 64 to retain a key which couples shaft 30 to coupler shaft 80 via slots or keyways cut into the adjacent ends thereof. In addition to providing ease of assembly and disassembly of the windmill, expansion joint 62 allows for independent expansion and contraction of shafts 38,80 while they remain fixedly connected to one another. Undue stress upon the supporting bearing surfaces of shaft 30 due to expansion, contraction and the like is thus prevented.

A shaft 70 is fixedly coupled to the lower end of coupler shaft 80 by a joint 84. Joint 84 is also useful in assembly and disassembly of the rotor. Shaft 70, which may be coupled to an appropriate energy conversion mechanism, e.g., a pump, electric generator, etc., is driven by rotation of rotor 14 and shaft 30.

The assembly features of the rotor thus described, joint 84, exapansion joint 62, and short section coupler shaft 80, also allow a plurality of windmills such as the one illustrated in FIGS. 1, 2 and 3 to be constructed one on top of another to form a composite windmill such as that illustrated in FIG. 4 for driving a single energy conversion machine through a plurality of shafts joined endwise through multiple joints 62,84 and coupler shafts 80. The structural strength provided by concentrator vanes 12 and 24 and pillars 26 of FIGS. 1, 2 and 3 allows the construction of such multi-story windmills several stories in height. An additional advantage of such a composite windmill, particularly in urban areas, lies in the tendency of the winds to be steadier a few hundred feet above the ground level. Such a composite windmill may be constructed with sufficient height to use the steadier winds to advantage.

An additional feature of the composite windmill of FIG. 4 is the provision of a ledge 80 at the plane of the junction of the lower levels of the composite windmill with the upper levels. This ledge, provided by decreasing the diameters of the generally cylindrical housings of the upper level windmills, is advantageous because it provides a base upon which construction equipment and materials may be placed to aid in constructing upper levels of the composite windmill.

The ease of assembly and disassembly for maintenance purposes provided by elements 62,84 and 80 of FIGS. 6 and 6a also allows upper stories of the composite windmill of FIG. 4 to be disconnected from lower stories for maintenance while the lower stories remain connected to shaft 70. Additionally, a rotor on any one story can be uncoupled from the shaft for servicing by loosening clamps 46 and threaded coupler 74, allowing rotors below it to remain in service.

Thus, there has been disclosed a structure for a single or multiple-story windmill, which structure is provided with strengthening integral main and secondary concentrator vanes and support pillars. The rotors of the mutliple-story windmill turn joined drive shafts having a common axis. The shafts of one or more stories of the composite windmill can be uncoupled from the windmill for maintenance upon, or replacement of, one or more parts of the shafts or the rotors while the rest of the stories below remain in operation. Each of the joined rotors and shafts is supported from above and below. Below each rotor are two vertically spaced apart floors for support with a workspace and bearing and shaft coupler housing provided therebetween. The housing also houses an expansion joint which prevents expansion, contraction and like stresses from affecting the windmill. The windmill is provided with a rotor so constructed as to allow for adjustment of the tension between various parts thereof. These various tension adjustments are of assistance in preventing sagging of the rather large rotor assembly under its own weight.

I claim:

1. A windmill comprising a vertical shaft and a rotor fixedly connected thereto, said rotor comprising a plurality of equally peripherally spaced, vertically extending, trough-shaped wind scoops, each of said scoops having vertically extending leading and following edges joined respectively to the following and leading edges of adjacent wind scoops, said edges defining an outer cylindrical surface as said rotor rotates, and each of said scoops having a radially outwardly directed open face defining a fixed length of arc on said cylindrical surface, said windmill further comprising a plurality of vertically extending, peripherally spaced apart wind-directing concentrator vanes, each of said concentrator vanes extending generally tangentially outwardly from said cylindrical surface, the proximal end of each of said concentrator vanes adjacent said cylindrical surface being cylindrically formed to extend through a length of arc greater than said length of arc described by each of said open faces of said wind scoops for substantially enclosing moving air flowing into said wind scoops as said scoops move behind said proximal ends of said concentrator vanes thereby impeding the escape of the moving air from between said ends of said concentrator vanes and said rotor as said rotor rotates.

2. A windmill according to claim 1 wherein each of said wind scoops further comprise closed upper and lower ends for impeding the escape of air from said ends.

3. A windmill comprising a generally cylindrically shaped housing having a vertical center axis, a rotor mounted for rotation about said axis, said rotor comprising a plurality of vertically extending trough-shaped wind scoops, each scoop having a closed back surface with vertically extending leading and following edges and a vertically extending open front exposed to the wind, said scoops being disposed to define a generally cylindrical scoop assembly defining a cylindrical outer surface, said housing comprising a plurality of stationary wind-directing and concentrating vanes, each of said vanes having a proximal end forming an arc of a cylinder substantially concentric with said cylindrical outer surface and of substantially equal diameter as said surface for closely spacing said rotor and said vanes, each of said vanes projecting outwardly generally tangentially from said cylindrical surface, wherein the length of said arc of a cylinder formed at the proximal end of each of said vanes exceeds the length of the arc of a cylinder described by the open front of each of said wind scoops for preventing the escape of air impinging upon the inner surfaces of said scoops from between said scoop and said proximal end of said stationary vane.

4. A windmill according to claim 3 wherein said rotor further comprises a central shaft concentric with said central axis, a plurality of members fixedly connected to said shaft and extending generally radially therefrom and connected to said scoop assembly, and a plurality of suspension means extending diagonally from near the top of said rotor proximate said shaft to near the bottom of said rotor proximate said scoop assembly and adapted for adjusting to vary the tension between said top of said rotor proximate said shaft and said scoop assembly to aid in supporting said scoop assembly on said shaft.

5. A windmill according to claim 3 wherein said rotor further comprises a central shaft concentric with said central axis and said housing further comprises a portion directly beneath said rotor having vertically spaced apart upper and lower floors defining a housing therebetween, the upper of said spaced apart floors comprising an upper bearing surface upon which is borne a bearing sleeve fixed to said shaft, said bearing surface of said upper floor thereby supporting at least a portion of the combined weight of said shaft and said rotor.

6. A composite windmill wherein a plurality of windmills according to claim 5 are disposed one on top of another and including expansion joint means for coaxially joining said shafts and preventing stress on the shaft and rotor of each said windmill by allowing for the expansion and contraction of said shaft of each windmill independently of expansion or contraction of the shaft of the windmill next above it.

7. A composite windmill according to claim 6 wherein the lower of said spaced apart floors of each said windmill comprises a lower bearing surface upon which is borne a bearing sleeve fixed to the shaft of the windmill next below said windmill for bearing at least a portion of the weight of the shaft and rotor of the windmill next below said windmill.

8. A windmill according to claim 3 including secondary wind directing and concentrating vanes and pillars vertically disposed between said concentrator vanes for providing further suppport for said housing.

9. A composite windmill which comprises a plurality of windmills according to claim 8 constructed one upon another.

10. A composite windmill according to claim 9 comprising at least one pair of adjacent windmills wherein the diameter of said generlally cylindrical housing of the upper of said pair of windmills is substantially less than the diameter of the generally cylindrical housing of the lower of said pair for providing a ledge at the plane upon which the to of said lower and upper windmills of said pair are joined for aiding in the construction of said composite windmill.

* * * * *